(12) United States Patent
Mallwitz et al.

(10) Patent No.: US 8,138,638 B2
(45) Date of Patent: *Mar. 20, 2012

(54) DC/DC CONVERTER (75) Inventors: Regine Mallwitz, Kassel (DE); Peter Zacharias, Kassel (DE); Bernd Engel, Wolfenbüttel (DE)

(73) Assignee: SMA Solar Technology AG, Niestetal (DE)

( * ) Notice: Subject to any disclaimer, the term of this patent is extended or adjusted under 35 U.S.C. 154(b) by 197 days.

This patent is subject to a terminal disclaimer.

(21) Appl. No.: 12/498,513

(22) Filed: Jul. 7, 2009

(65) Prior Publication Data

US 2010/0008105 A1 Jan. 14, 2010

(30) Foreign Application Priority Data

Jul. 9, 2008 (EP) ..................... 08012365
Dec. 20, 2008 (EP) ..................... 08022223

(51) Int. Cl.
*G05F 3/06* (2006.01)
(52) U.S. Cl. ....................................... 307/151
(58) Field of Classification Search ............ 307/151
See application file for complete search history.

(56) References Cited

U.S. PATENT DOCUMENTS 5,357,419 A 10/1994 Limpaecher
6,061,259 A 5/2000 DeMichele
2008/0055941 A1 3/2008 Victor et al.
2009/0034304 A1* 2/2009 Engel et al. ............... 363/71

FOREIGN PATENT DOCUMENTS

DE 10 2004 037 446 B4 6/2006
DE 10 2005 023 291 A1 11/2006
EP 1 369 985 A2 12/2003

OTHER PUBLICATIONS

Klaassens, J.B., "Power Conditioning With a Switched Series-Resonant Circuit Operating at a High Internal Frequency," 1987, pp. 193-203, IEEE.
Severns, R., "Topologies for Three Element Resonant Converters," 1990, pp. 712-722, IEEE.

* cited by examiner

*Primary Examiner* — Robert L. Deberadinis
(74) *Attorney, Agent, or Firm* — Slater & Matsil, L.L.P.

(57) ABSTRACT

The object of the invention is a high-efficiency DC/DC converter, in particular for photovoltaic plants, incorporating a transformerless DC/DC converter operated in the resonant mode of operation for converting a unipolar direct input voltage with an associated positive pole (+) and with a negative pole (−). There is imposed a resonance circuit incorporating at least one resonance inductance and at least one resonance capacitance, each resonance capacitance being connected to a respective one of the rectifier circuit arrangements in such a manner that the bipolar direct output voltage is provided, a voltage boosting circuit arrangement being connected to each resonance capacitance and to the rectifier circuit arrangement.

35 Claims, 9 Drawing Sheets

DC/DC CONVERTER

BACKGROUND OF THE INVENTION

The invention relates to a transformerless direct current-direct current (DC/DC) converter, which is operated in the resonant mode of operation, has boosting properties and affords grounding of the DC source.

Transformerless inverters, which allow for boosting a direct-current (DC) source voltage, are known from prior art. The document DE 10 2004 037 446 B4 describes such an inverter.

A symmetrical boosting switch is connected downstream of the DC source. It is followed by a direct current-alternating current (DC-AC) converter in the form of a single- or multiple-phase bridge circuit. The boost converter allows for boosting the DC input voltage as large as necessary. On photovoltaic inverters, the input voltage at the DC-AC converter must be higher than the grid peak voltage in order to feed the grid. If the DC source voltage is not high enough, a boost converter is suited to boost the voltage to the value required. If the DC source voltage is high enough, the boost converter is inactive. A disadvantage is the conductive losses of the boost converter diodes, losses which also occur when the boost converter is not active. These diodes always lie in the current path between the source and the DC-AC converter. Another disadvantage of the prior art mentioned above is that there is no possibility of grounding the source.

On DC/DC converters comprising only one voltage input with only one positive pole and one negative pole, which do not contain any additional grounding terminal, either the negative pole or the positive pole must be grounded if grounding takes place on the input side. It is desired to ground the negative pole or the positive pole on photovoltaic modules of a photovoltaic plant for example. An advantage is thereby obtained with converter circuits that allow for grounding at the voltage input. A particular advantage is obtained if the converter circuit affords grounding at any pole.

The grounding of the DC source, in particular of the photovoltaic module of a photovoltaic plant, eliminates the problem of high capacitive leakage currents occurring on transformerless inverters in photovoltaic plants. These leakage currents are to be reduced or, even better, to be avoided. Transformerless solutions however are preferred because of their light weight and of the cost advantages.

Moreover, the input voltage varies very strongly on inverters having photovoltaic generators connected thereto. A beneficial efficiency is desired for such inverters in an operating range as wide as possible under these conditions.

Also described in the prior art, photovoltaic inverters often consist of several stages, e.g., of a DC/DC converter located on the input side and of a DC-AC converter.

BRIEF SUMMARY OF THE INVENTION

It is the object of the invention to provide a transformerless DC/DC converter that is suited for photovoltaic plants, that is highly efficient and that allows for continuous input voltage boosting or bucking when the need arises.

A preferred embodiment of the invention is a transformerless DC/DC converter operated in the resonant mode of operation for converting a unipolar direct input voltage with an associated positive pole (+) and a negative pole (−) into a bipolar direct output voltage with an associated positive pole (+), a grounding pole (GND) and a negative pole (−), with a resonance circuit incorporating at least one resonance inductance and at least one resonance capacitance, each resonance capacitance being connected to a respective rectifier circuit arrangement in such a way that the bipolar direct output voltage is applied, a voltage boosting circuit arrangement being connected to each resonance capacitance and to the rectifier circuit arrangement.

The invention relies on the idea to provide a transformerless DC/DC converter that is operated in the resonant mode of operation, that performs continuous input voltage boosting in one stage and thus operates with minimum losses and hence with high efficiency. The DC/DC converter may be a constituent part of a photovoltaic inverter but may also be used for other applications.

The converter circuit of the invention is advantageous because it is suited for positive or negative pole grounding, because it is always protected by this flexible grounding so that no capacitive leakage currents can occur. This is achieved in that the capacitance(s) of the resonance circuit ensure direct voltage isolation between the photovoltaic (PV) generator and the grid inverter and in that the resonant inverter of the invention operates at frequencies that are considerably higher than the grid frequency. Moreover, the resonance operation and the transformerless implementation allow for light weight and for high efficiency.

The demand for additional increase in efficiency is met by the transformerless resonance converter in combination with the additional boost arrangement that is connected between a respective resonance capacitor and the associated rectifier located on the output side. A boost arrangement consists of at least one switch. Each additional boost arrangement forms, together with the resonance inductance, one boost converter. The diode of the boost converter is at least one of the rectifier diodes or at least one diode that is a constituent part of the boost arrangement.

Other advantageous implementations of the invention will become apparent in the dependent claims.

In order to secure the wide voltage range, it is necessary to allow for operation both in the base mode (buck mode) and in the boost mode of the invention. If the switching processes are interrupted, the flow of energy between the PV generator and the grid is stopped by the insulation of the oscillating circuit capacitor. Thanks to the component part arrangement of the invention and to the triggering of the switches, the switching losses occurring when the switches are being turned on and off are significantly reduced over known arrangements.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 5 shows the principle illustrated in FIG. 4, but extended to a higher voltage transmission than in FIG. 4a;

FIGS. 6 and 7 show embodiments for a voltage transmission that is lower than in FIG. 4a, with the same number of switches as in FIG. 4a.

DETAILED DESCRIPTION OF THE INVENTION

In FIG. 1 there is shown a basic circuit of the resonant switching DC/DC converter with a grounded negative pole of the DC source without the interconnected boost arrangements.

A photovoltaic generator or another DC source can be connected. There are various possibilities of grounding the DC source. The photovoltaic generator may for example be grounded at the positive pole or at the negative pole. Grounding can also be eliminated. The circuit is changed accordingly.

The circuit consists of a half bridge with two branches. The first branch consists of the two switches S1, S2 and of its anti-parallel diodes D1, D2. The second branch consists of the two series-connected capacitors C3, C4.

Figure 1A:
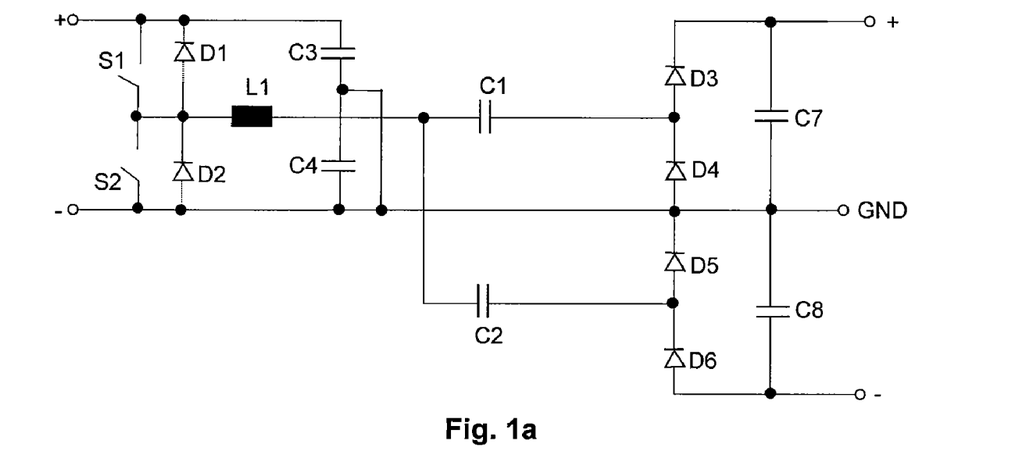
FIGS. 1-3 show variations of a preferred embodiment of a transformerless DC/DC converter operated in the resonant mode of operation with the diverse grounding possibilities for the DC input.

In FIG. 1a the capacitor C4 is bridged and there is a connection between the connection point of the two capacitors C3, C4 and GND. As a result, the negative pole of the DC source is grounded.

A resonance circuit is connected to the connection point of the switches S1, S2. The resonance circuit consists of a resonance inductance L1 and of two capacitors C1, C2 in which the current divides into two paths.

Each resonance capacitor C1 or C2 is interconnected to a rectifier circuit array consisting of the diodes D3, D4 or D5, D6 in such a manner that there is a bipolar direct output voltage with +GND, –, and a unipolar voltage with +, – being applied at the input. Furthermore, additional capacitors C7, C8 are connected in parallel with the pairs of diodes D3, D4 and D5, D6.

The switches S1, S2 are semi-conductor switches and half-bridge switches.

Figure 2:
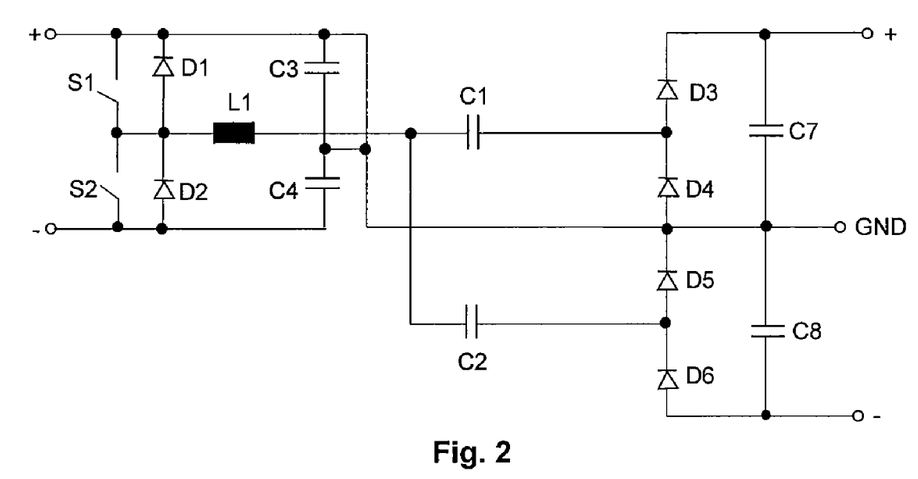
Figure 3:
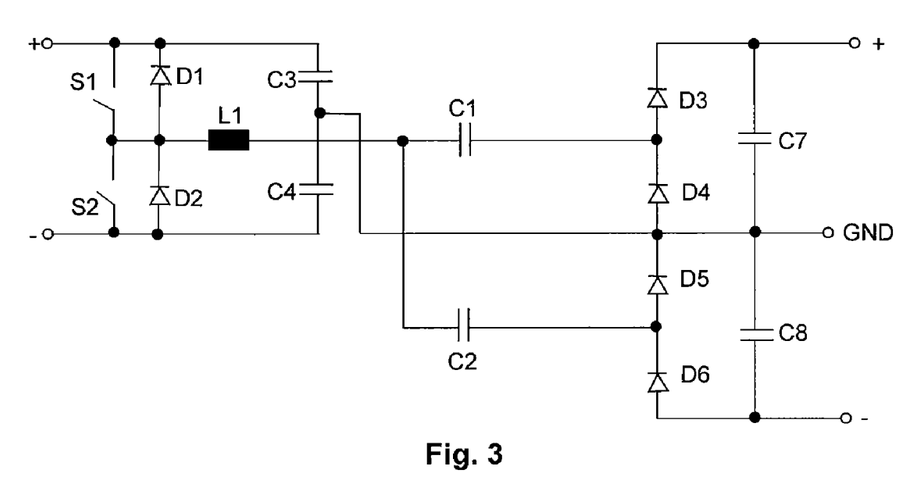

The FIGS. 2 and 3 show variants of the basic circuit with grounded positive pole or without generator grounding.

In FIG. 2, the positive pole of the DC source is grounded. The capacitor C3 is bridged and the connection point of the two capacitors C3, C4 is connected to GND.

FIG. 3 shows a variant in which the DC source is not grounded. Both capacitors C3, C4 are active constituent parts of the circuit. The connection point of the two capacitors C3, C4 is connected to GND.

Figure 1B:
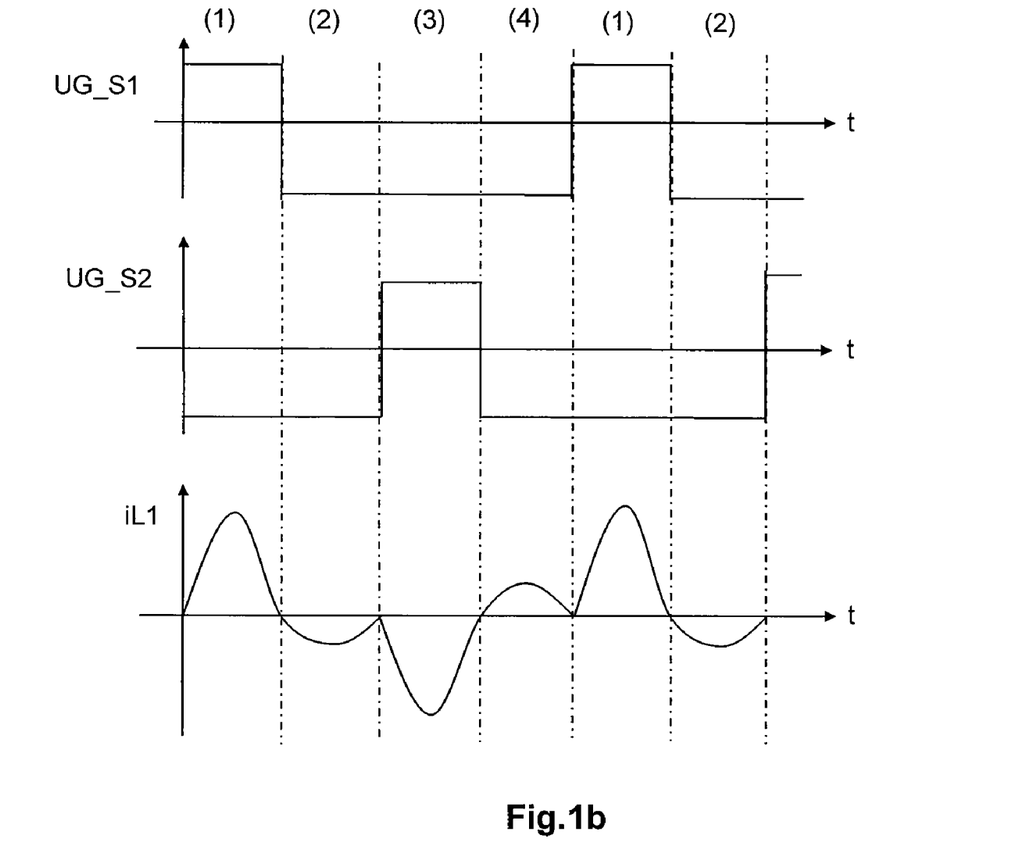

FIG. 1b shows the associated flow of the current through the resonance inductance L1 as well as of the gate voltages at the semi-conductor switches S1 and S2.

As shown in FIG. 1b, a recurring switching pattern with four consecutive switching states is possible, namely:

(1) S1 on, S2 off
(2) S1 off, S2 off
(3) S1 off, S2 on
(4) S1 off, S2 off

During the state (1), a current flows through the upper switch S1 and the inductance L1. At the connection point between the inductance L1 and the capacitors C1 and C2, the current divides into two paths. The current flows on the one side through the upper capacitor C1 and through the diode D3 into a load connected between the output (+) and the ground GND. The capacitor C7 is charged thereby. On the other side, a current flows to ground GND, through the lower capacitor C2 and the diode D5. At ground GND, the two currents add up and flow back via the capacitor C3. The turn-on time of the upper semi-conductor switch S1 corresponds to half the resonance period so that the switch S1 is not only turned on without current but also turned off without current. The resonance period $T_R$ is given by:

$$T_R = 2\pi\sqrt{L_1(C_1/C_2)}$$

In state (2), the upper semi-conductor switch S1 opens again. Since the current flowing through the inductance L1 is reversed as a result of the resonance, a current now flows through the diode D1 and the capacitor C3. At the connection point of ground GND, the current divides. One branch flows through the diode D4 and through the capacitor C1 as well as through the inductance L1. The other branch flows through the load interposed between ground GND and (–) via the diode D6 and the lower capacitor C2 as well as via the inductance L1. The capacitor C8 is charged. The duration of this state approximately corresponds to half the resonance period $T_R$. Hence, the current through the inductance L1 flows in a half sine wave but with reversed polarity compared to the current during state (1).

In state (3), the lower switch S2 is closed. A current flows through the lower switch S2 with the same polarity as in state (2). At the connection point of ground GND, the current divides, on the one side through the diode D4 and through the capacitor C1, on the other side through the load between ground GND, (–), the diode D6 and the capacitor C2. The current flows back through the inductance L1. The capacitor C8 is charged. The turn-on time of the lower switch S2 corresponds to half the resonance period so that here again the switch S2 is not only turned on without current but is also turned off without current.

In state (4), the two switches S1 and S2 are open. A current flows through the diode D2 and through the inductance L1 and then divides so that the current flows through the capacitor C1 and the diode D3 or through the capacitor C2 and the diode D5. The capacitor C7 is charged thereby. The half sine wave current through the inductance L1 however has a reversed polarity, compared to the current during state (3).

An advantage is obtained if the switches S1 and S2 turn on and off without current and, as a result thereof, almost without any loss. Through the two rectifier arrangements at the output, the input voltage is maximally doubled if one considers the difference between the positive and the negative output potential. By adding another pair of rectifiers to the circuit and by connecting it in series with the existing pair of rectifiers with the diodes D3, D4 and D5, D6 respectively in connection with other resonance capacitors connected upstream thereof, the input voltage can be boosted further. Other pairs of rectifiers and resonance capacitors are possible. It is possible to continuously adjust the output voltage below the maximum value by changing the switching frequency, which corresponds maximally to the resonance frequency. The object is to change the circuit in such a manner, using a wiring measure, that values above the maximum values mentioned herein above may also be continuously adjusted.

Figure 4A:
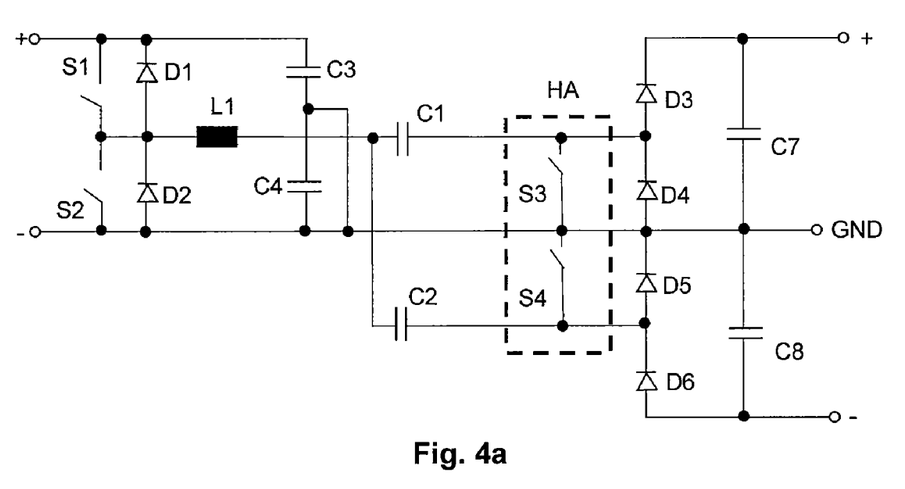
FIGS. 4a-4c show the transformerless DC/DC converter operated in the resonant mode of operation shown in FIG. 1, with the boost arrangements of the invention in a schematic diagram with the corresponding signal waveforms.

According to the embodiment shown in FIG. 4a, a boost circuit arrangement HA is respectively connected between a resonance capacitance C1, C2 and the associated rectifier, which consists of diodes D3, D4 and D5, D6 respectively. This boost circuit arrangement allows for selective bridging of the rectifier inputs connected downstream thereof through switches. In the preferred exemplary embodiment, these boost arrangements are thereby connected parallel to at least one of the rectifier diodes D3, D4 and D5, D6 respectively, preferably however, the arrangement of a switch S3 is connected parallel to the diode D4 and the arrangement of a switch S4, parallel to the diode D5.

The way of functioning of the boost arrangements HA will be described herein after.

Figure 4B:
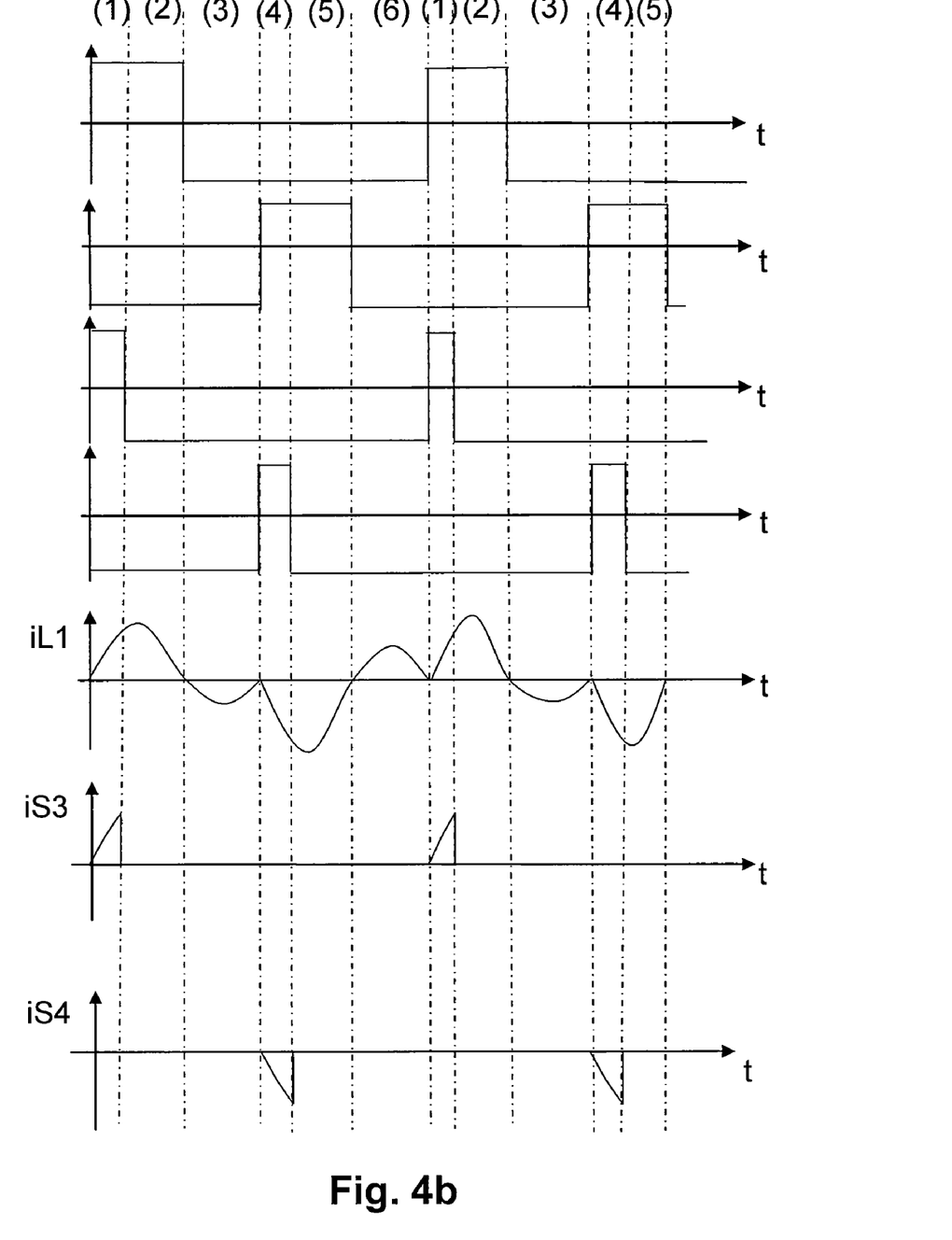

FIG. 4b shows the associated curves of the gate voltages UG_S1 to UG_S4 at the semi-conductor switches S1 through S4 as well as of the current iL1 through the inductance L1 as well as of the current iS3 through switch S3 or of the current iS4 through switch S4 for the boost mode of operation. In FIG. 4b, the switching frequency is approximately equal to half the resonance frequency of the oscillating circuit.

If the switch S1 is turned on, S3 can be turned on at the same time for a certain period of time (Phase (1)). For the output of the oscillating circuit inverter this acts as a short-circuit of the inputs of the rectifier connected downstream thereof. As a result, the inductance of the oscillating circuit can be charged with more energy for a short period of time. In the following phase (2), the oscillating circuit delivers this additional energy to C7 via D3. Phase (3) substantially serves for voltage-free commutation of the switch S3.

In the phases (4) through (6), the phases (1) through (3) are repeated for the other group of switches S2 and S4. This means that the switches S2 and S4 are at first turned on simultaneously in phase (4). The energy additionally stored in the oscillating circuit is next substantially delivered again in phase (5). Phase (6) substantially serves for turning off S2 without voltage.

Figure 4C:
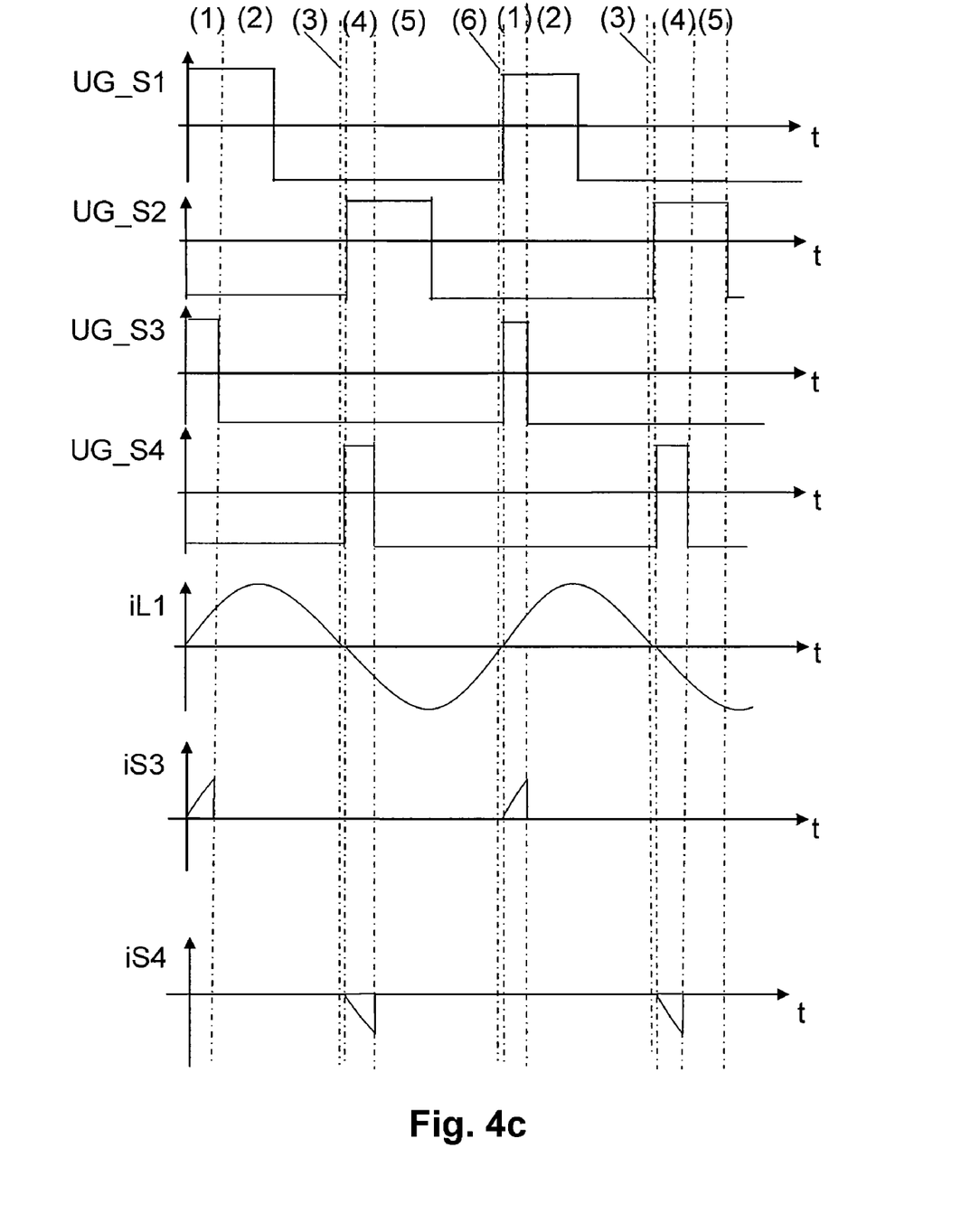

Since the phases (3) and (6) participate only little in the transmission of energy and mainly serve to relieve switching, it is obvious to shorten this phase as far as practicable. Because the switching times of modern transistors are in the sub-microsecond range, these phases can be shortened accordingly. This can be achieved by increased switching frequency of the switches S1 and S2. For the switching frequency, the resonance or natural oscillation frequency of the oscillating circuit L1 and C1 is the upper limit value. FIG. 4c shows the relations for these conditions. Here, the duration of the phases (3) and (6) have shrunk to short periods of time. This provision serves to better exploit the switches and to reduce the losses in the overall circuit.

Figure 5:
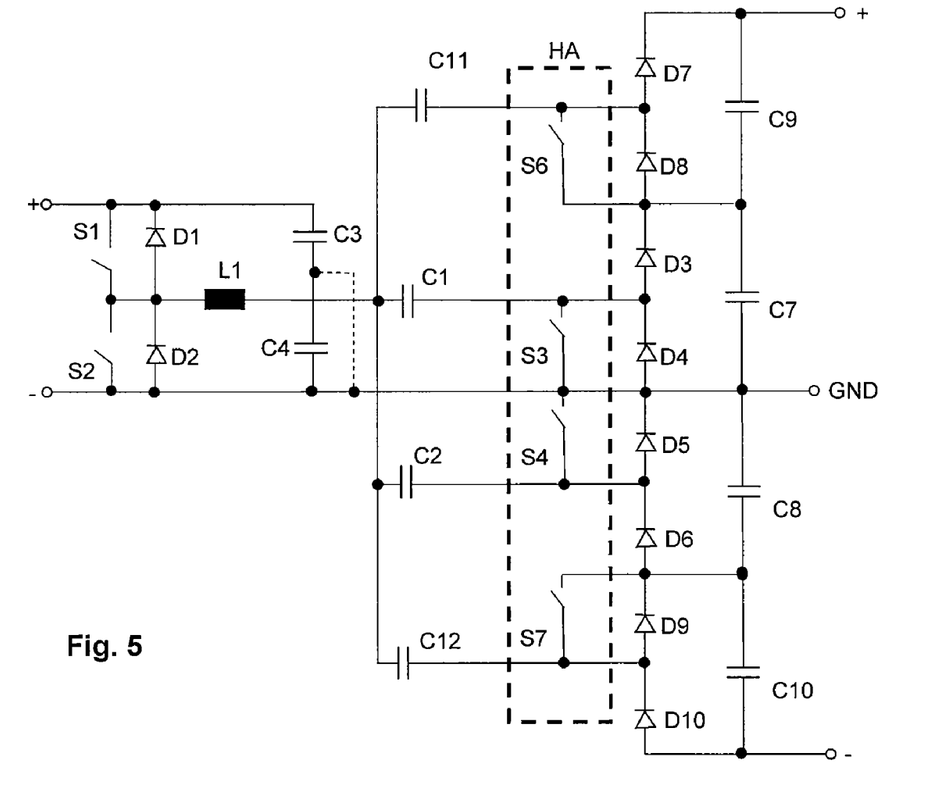

FIG. 5 shows another embodiment (II) of the DC/DC converter of the invention. The inverter was hereby complemented with two additional rectifier units that are series-connected together. This doubles the peak output voltage if the boost arrangement HA is not operative. The operation sequences are as shown in FIG. 4 except that the respective pairs of switches S3 and S6 as well as S4 and S7 are switched at the same time.

In this solution, four resonance capacitances C11, C1, C2, C12, which are connected to the resonance inductance L1 at a common connection point, are provided, a switch S6, S3, S4, S7 being associated with a respective one of said capacitances. At the output, there are connected in series eight diodes D7, D8, D3, D4, D5, D6, D9 and D10 and there are provided four output capacitors C9, C7, C8 and C10.

The first switch S6 lies between the capacitance C11 and the diodes D3, D8. The second switch S3 lies between the capacitance C1 and the diodes D4, D5. The third switch S6 lies between the capacitance C2 and the diodes D5, D6. The fourth switch S7 lies between the capacitance C12 and the diodes D9, D10.

Figure 6:
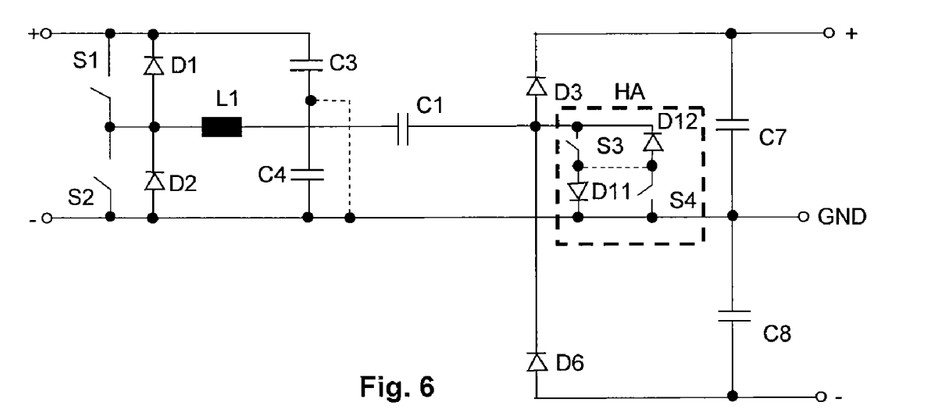

FIG. 6 shows a third embodiment (III) of the DC/DC converter of the invention. Through the implementation of the rectifier at the output, which is changed compared to FIG. 4a, only half of the output voltage that can be maximally achieved in FIG. 4a is possible without activating the boost arrangement HA. The boost arrangement HA consists here also of the switches S3 and S4, which are triggered in the same way as in FIG. 4b and in FIG. 4c. In the practical implementation, these switches S3 and S4 are complemented with the diodes D7 and D8, which prevent the switches from being loaded backward.

Only one single resonance capacitance C1 is provided, which is series-connected to the resonance inductance L1. The voltage boosting circuit arrangement HA is connected between the resonance capacitance C1 and ground GND, the voltage boosting circuit arrangement HA consisting of two switches S3, S4 with series-connected diodes D11, D12.

Figure 7:
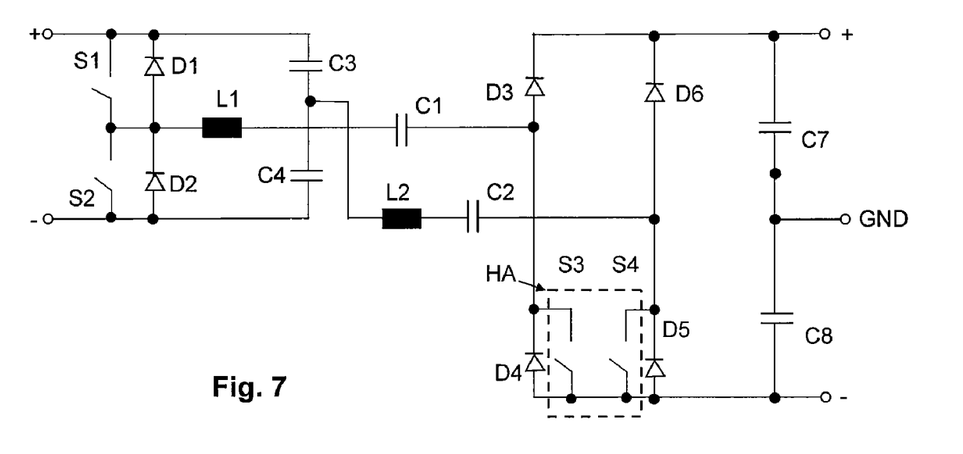

FIG. 7 shows another embodiment (IV). The transmission properties are similar to those of the embodiment in FIG. 6. However, the potentials of the terminals of the DC output and of the DC input of the circuit are not fixed with respect to each other as they are in FIG. 4. The boost arrangement serving to achieve the selective short-circuit of the input of the rectifier circuit is hereby realized with the switches S3 and S4 by connecting them in parallel with the rectifier diodes D4 and D5. In this case as well, the switches are triggered in the same way as shown in FIG. 4b, 4c.

In this case, the DC generator can be connected ad lib to GND since it is decoupled from the rectifier+from the boost arrangement (HA) through C1 and C2 as well as through L1 and L2, both in terms of direct current and in terms of alternating current.

The circuit incorporates a first inductance L1 with a series-connected capacitance C1 and a second inductance L2 with a series-connected capacitance C2. The boost circuit arrangement HA is connected between the two capacitances C1, C2.

Figure 8A:
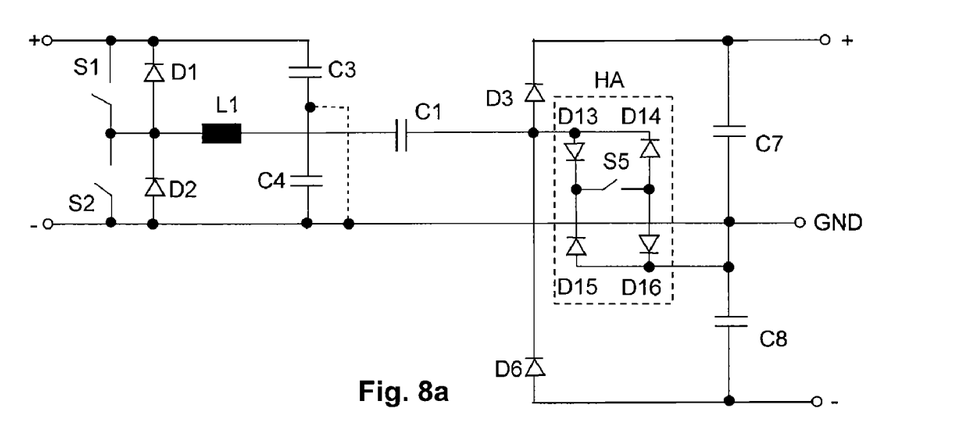
FIGS. 8a-8c show an embodiment of the circuit arrangement of the invention with only 3 active switches, together with the associated signal waveforms.
Figure 8B:
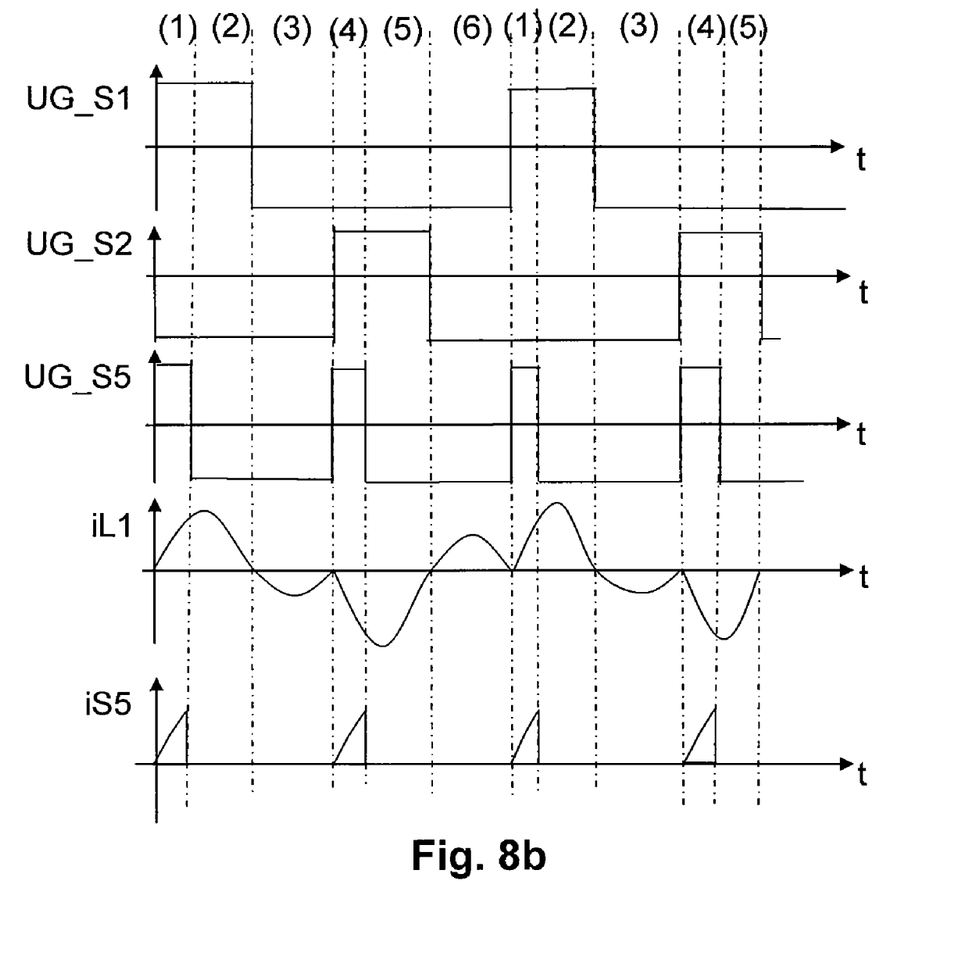
Figure 8C:
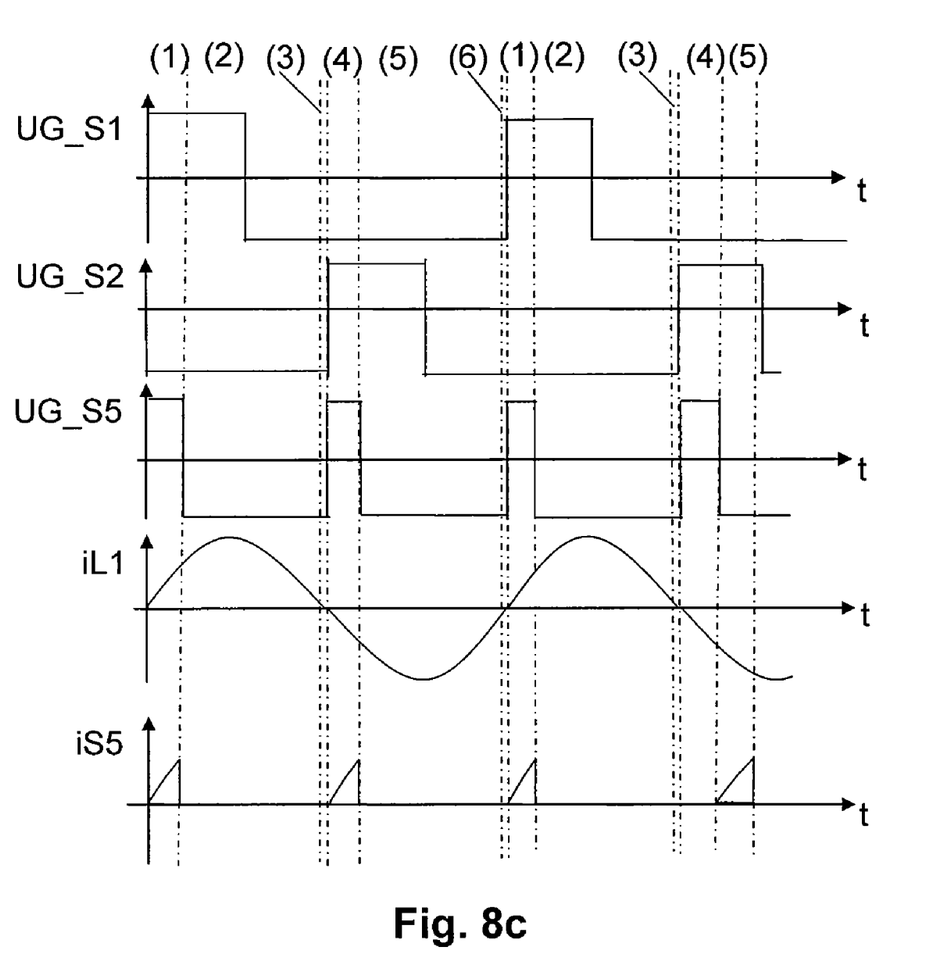

FIG. 8 shows another embodiment (V) of the arrangement of the invention. The selective temporary short-circuits at the input of the rectifier are implemented in FIG. 8 by a bidirectional switch S5 in connection with the diodes D13 through D16. S5 is turned on at the same instants of time at which the switches S3 or S4 are turned on in the other implementation variants (FIGS. 4 through 7). The switching frequency of S5 is therefore double the frequency of S3 (FIG. 8b).

In this case, the voltage boosting circuit arrangement HA incorporates one single switch S5 that is respectively interposed between two pairs of diodes oriented in opposite directions D13, D15 and D14, D16, said pairs of diodes being connected both to the resonance capacitance C1 and to the rectifier circuit arrangement D3, D6 at one common connection point and to ground GND at their other common connection point.

Compared to the basic circuit shown in FIG. 1a, two additional switching operations are now inserted into the circuit arrangements of the invention. When switch S1 or S2 is closed, switch S3 or S4 (or, in the exemplary embodiment 8, switch S5) is closed for a certain period of time. Switch S3 however opens again whilst switch S1 is still closed. Hence, the switching conditions (1) and (4) are the conditions in which energy is stored temporarily in the boost converter inductance, just like in a conventional boost converter. Here, the boost converter inductance is the resonance inductance L1. The switching conditions (1) and (4) are referred to herein as the boosting switching conditions.

If the DC/DC converter is not operated in the boosting mode of operation, the switches S3, S4 are not closed. Then, only the switching conditions (2), (3), (4) and (5) occur.

In state (1), a current flows through the switch S1 and the inductance L1. Then, the current divides so that one current branch flows through the capacitor C1, the switch S3 and to ground GND on the one side and one current branch flows through the capacitor C2, the diode D5 to ground GND on the other side. Then, the current flows together at ground GND and through the capacitor C3. Energy is hereby stored in the inductance L1 and no energy is delivered to the load.

In state (2), a current flows through the switch S1 and the inductance L1. Then, the current divides so that one current branch flows through the capacitor C1, the diode D3 and the load located between (+) and the ground GND on the one side so that the capacitor C7 is loaded and that one current branch flows through the capacitor C2 and the diode D5 to ground GND on the other side. The current flows together at ground GND and through C3. In this state, the inductance L1 delivers the additional energy stored in state (1) to the load. As a result, a higher voltage is applied at the output, i.e. at the load between (+) and ground GND.

In state (3), a current flows through the diode D1 and the capacitor C3. The current then divides so that one current branch flows through the diode D4 and the capacitor C1 on the one side and one current branch to the load connected between ground GND and (+) on the other side. Then, the capacitor C8 is charged. The two currents flow together at the connection point of the capacitors C1, C2 and of the inductance, a current flowing through the inductance L1.

In state (4), a current flows through switch S2 so that a current flows through the diode D4 and the capacitor C1 on the one side and one current branch flows through the switch S4 and the capacitor C2 on the other side. The two current branches flow together at the connection point of the capacitors C1, C2 and the inductance L1. A current flows through the inductance L1 to switch S2. In this state, energy is stored in the inductance L1. No energy is delivered to the load.

In state (5), a current flows through switch S2. Then, the current divides so that current flows from the ground GND through the diode D4 and the capacitor C1 on the one side and that current flows from ground GND through the load connected between ground GND and (−) through the diode D6 and the capacitor C2. The capacitor C8 is charged. The two currents flow together at the connection point of the capacitors C1, C2 and of the inductance L1, current flowing through the inductance L1 to switch S2. In this state, the inductance L1 delivers to the load the energy stored in state (4) so that a higher voltage is applied at the output, i.e., at the load between (+) and ground GND.

In state (6), a current flows through the diode D2 and the inductance L1. Then, the current divides so that, on the one side, a current flows through the capacitor C1, the diode D3 and the load between (+) and ground GND, the capacitor C7 being charged, and that, on the other side, a current flows through the capacitor C2 and the diode D5. The current flows together at ground GND and further through diode D2.

The exemplary embodiments shown in FIG. 5 through 8 have in principle the same function characteristics and switching phases so that they have been grouped in the present specification of the invention. The switching phases described occur in the same way in all the exemplary embodiments and only differ in terms of technical realisation by the different kinds of connected rectifiers at the output of the circuit. The specification of the switching phases therefore also applies for the exemplary embodiments 5 through 7.

The implementation variant shown in FIG. 8 only differs by the fact that a bidirectional switch is utilized for short-circuiting the rectifier connected downstream thereof, said switch then switching at twice the switching frequency of the variants mentioned previously in FIG. 4 through 7. Corresponding signal wave forms are shown in FIG. 8b.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A transformerless DC/DC converter operated in a resonant mode of operation for converting a unipolar direct input voltage with an associated positive pole and a negative pole into a bipolar direct output voltage with an associated positive pole, a grounding pole and a negative pole, the DC/DC converter comprising:
   a resonance circuit incorporating at least one resonance inductance and at least one resonance capacitance;
   a respective rectifier circuit arrangement coupled to each resonance capacitance in such a way that the bipolar direct output voltage is produced; and
   a voltage boosting circuit arrangement connected to each resonance capacitance and to the rectifier circuit arrangement.

2. The DC/DC converter as set forth in claim 1, wherein the voltage boosting circuit arrangement incorporates at least one triggerable boosting switch.

3. The DC/DC converter as set forth in claim 1, wherein there are provided at least two resonance capacitors that are connected to the resonance inductance at one common connection point.

4. The DC/DC converter as set forth in claim 3, wherein the voltage boosting circuit arrangement is interposed between the resonance capacitors and the rectifier circuit arrangement.

5. The DC/DC converter as set forth in claim 4, wherein the voltage boosting circuit arrangement incorporates two boosting switches with anti-parallel diodes, said switches being wired in opposite directions.

6. The DC/DC converter as set forth in claim 4, wherein the voltage boosting circuit arrangement incorporates one boosting switch with one parallel diode each, said diodes being a constituent part of an associated output rectifier.

7. The DC/DC converter as set forth in claim 2, wherein the switches in the voltage boosting circuit arrangement are activated alternately by closing the at least one switch, partial resonance circuits being short-circuited by closing the at least one switch and a current flowing through the at least one switch and through associated parallel diodes.

8. The DC/DC converter as set forth in claim 2, wherein:
   the at least one resonance capacitance comprises four resonance capacitances that are connected to the resonance inductance at one common connection point; and
   the at least one triggerable boosting switch comprises four switches, each of the four switches being associated with a respective one of the four resonance capacitances.

9. The DC/DC converter as set forth in claim 2, wherein the resonance circuit comprises a first inductance coupled in series with a first series-connected capacitance, and a second inductance coupled in series with a second series-connected capacitance, wherein the voltage boosting circuit arrangement is connected between the first and second series-connected capacitances.

10. The DC/DC converter as set forth in claim 9, wherein the voltage boosting circuit arrangement consists of two switches that are each connected in parallel to one diode of the rectifier circuit arrangement.

11. The DC/DC converter as set forth in claim 2, wherein the resonance circuit comprises one single resonance capacitance that is connected in series with the resonance inductance.

12. The DC/DC converter as set forth in claim 11, wherein the voltage boosting circuit arrangement is connected between the resonance capacitance and ground, said voltage boosting circuit arrangement consisting of two switches with series-connected diodes.

13. The DC/DC converter as set forth in claim 11, wherein the voltage boosting circuit arrangement comprises a switch that is disposed between two pairs of diodes which are oriented in opposite directions, said pairs of diodes being connected at one common connection point both to the resonance capacitance and to the rectifier circuit arrangement and at their other common connection point to ground.

14. The DC/DC converter as set forth in claim 1, wherein the voltage boosting circuit arrangement is activated only if the input voltage of the DC/DC converter falls below a fixed value.

15. The DC/DC converter as set forth in claim 1, wherein one of the positive pole and the negative pole is connected to ground.

16. An inverter comprising the DC/DC converter as set forth in claim 1, the inverter configured to convert a direct voltage into an alternating voltage conforming to a power grid.

17. The inverter of claim 16, wherein the inverter is a photovoltaic inverter configured to convert a photovoltaic voltage into the alternating voltage conforming to the power grid.

18. A transformerless power converter comprising:
a plurality of switches coupled to a plurality of DC input terminals;
a resonant circuit coupled to the plurality of switches, the resonant circuit comprising an inductor and a series capacitor;
a rectifying bridge coupled to the series capacitor, the rectifying bridge configured to output a DC voltage at a plurality of output terminals; and
a voltage boosting circuit coupled between the resonant circuit and the rectifying bridge, the voltage boosting circuit comprising at least one switch configured to be closed during a time period in which an absolute value of the inductor is increasing, and be open when energy is transferred from the resonant circuit to the rectifying bridge.

19. The power converter of claim 18, wherein a switching frequency of the plurality of switches is about one-half a resonance frequency of the resonance circuit.

20. The power converter of claim 18, wherein the at least one switch of the voltage boosting circuit comprises a plurality of switches configured to bypass at least one diode of the rectifying bridge.

21. The power converter of claim 18, wherein the voltage boosting circuit comprises:
a first diode coupled between the resonance circuit and a first intermediate node;
a second diode coupled between the first intemiediate node and a reference voltage;
a third diode coupled between the resonance circuit and a second intermediate node;
a fourth diode coupled between the second intermediate node and the reference voltage; and
a switch coupled between the first intermediate node and the second intermediate node.

22. The power converter of claim 21, wherein
the series capacitor comprises a plurality of series capacitors;
the rectifying bridge comprises a plurality of stacked diode pairs coupled to a plurality of capacitors stacked between a positive and negative output terminal of the rectifying bridge; and
the voltage boosting circuit comprises a plurality of switches coupled between an anode and a cathode of a diode within each of the plurality of stacked diode pairs, each of the plurality of switches having a terminal coupled to a corresponding series capacitor of the plurality of series capacitors.

23. A method of operating a transformerless power converter comprising a plurality of switches coupled to a plurality of DC input terminals, a resonant circuit coupled to the plurality of switches, the resonant circuit comprising an inductor and a series capacitor, at least one further switch coupled to the resonant circuit, and a rectifying bridge coupled to the at least one further switch, the rectifying bridge configured to output a DC voltage at a plurality of output terminals, the method comprising:
alternatively coupling the inductor to each of the plurality of DC input terminal for a first pulse duration; and
applying a low impedance to the resonant circuit during a first portion of the first pulse duration, the first portion of the first pulse duration being shorter than the first pulse duration.

24. The method of claim 23, wherein applying the low impedance comprises a applying a short circuit via the at least one further switch.

25. The method of claim 24, wherein the first portion of the first pulse duration occurs when an absolute value of a current through the inductor is increasing.

26. The method of claim 25, further comprising operating a power inverter comprising the transformerless power converter coupled to a DC-AC converter.

27. A transformerless resonant DC/DC converter for converting a DC input voltage at DC input terminals into a bipolar DC output voltage at a positive, a neutral and a negative DC output terminal, the converter comprising:
a bridge circuit coupled to the DC input terminals; and
a rectifier comprising
a first rectifier bridge coupled between the positive and the neutral DC output terminals, and
a second rectifier bridge coupled between the negative and the neutral DC output terminals, wherein the bridge circuit is coupled to the first rectifier bridge by a first series connection of a first inductor and a first capacitor, and the bridge circuit is coupled to the second rectifier bridge by a second series connection of a second inductor and a second capacitor.

28. The converter of claim 27, wherein the first inductor and the second inductor are the same.

29. The converter of claim 27, wherein each rectifier bridge comprises two diodes connected in series with a respective midpoint, the bridge circuit being coupled to the respective rectifier bridge at the respective midpoint.

30. The converter of claim 27, wherein the neutral DC output terminal is connected to one of the DC input terminals.

31. The converter of claim 27, wherein the neutral DC output terminal is connected to a midpoint of series-connected capacitors arranged between the DC input terminals.

32. The converter of claim 27, further comprising a boost circuit arrangement with a first switch arranged between the neutral DC output terminal and a coupling point of the first series connection and the first rectifier bridge, and a second switch arranged between the neutral DC output terminal and a coupling point of the second series connection and the second rectifier bridge.

33. The converter of claim 32, wherein the first rectifier bridge comprises a series connection of two pairs of diodes, and the second rectifier bridge comprises a series connection of two pairs of diodes, each diode pair having a midpoint, the converter further comprising a third and fourth series connection of an inductor and a capacitor, wherein each series connection is coupled to an associated midpoint of one of the pairs of diodes.

34. A transformerless resonant DC/DC converter for converting a DC input voltage at DC input terminals into a bipolar DC output voltage at a positive, a neutral and a negative DC output terminal, the converter comprising:

a bridge circuit coupled to the DC input terminals;

a rectifier bridge coupled between the positive and the negative DC output terminal, wherein the bridge circuit is coupled to the rectifier bridge at a coupling point by a series connection of an inductor and a capacitor; and a boost circuit arrangement providing a switchable connection between the coupling point and the neutral DC output terminal, wherein the neutral DC output terminal is connected to one of the DC input terminals.

35. The converter of claim 34, wherein the rectifier bridge comprises two diodes connected in series; and the coupling point is a midpoint between the two diodes.

* * * * *